(12) United States Patent
Kemp et al.

(10) Patent No.: US 8,443,060 B2
(45) Date of Patent: May 14, 2013

(54) REMOTE CREATION OF PRINTER INSTANCES ON A WORKSTATION

(75) Inventors: Devon James Kemp, Laguna Hills, CA (US); Christopher John Carcerano, Aliso Viejo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 770 days.

(21) Appl. No.: 12/699,724

(22) Filed: Feb. 3, 2010

(65) Prior Publication Data
US 2010/0134819 A1 Jun. 3, 2010

Related U.S. Application Data

(63) Continuation of application No. 10/131,289, filed on Apr. 23, 2002, now Pat. No. 7,689,673.

(51) Int. Cl.
*G06F 15/177* (2006.01)
*G06F 15/173* (2006.01)
*G06F 3/00* (2006.01)

(52) U.S. Cl.
USPC .............................. 709/220; 709/223; 710/8

(58) Field of Classification Search ........................ None
See application file for complete search history.

(56) References Cited

U.S. PATENT DOCUMENTS

| | | | |
|---|---|---|---|
| 4,979,107 A | 12/1990 | Advani | |
| 5,047,957 A | 9/1991 | Ikenoue | |
| 5,371,837 A * | 12/1994 | Kimber et al. | 358/1.15 |
| 5,450,571 A | 9/1995 | Rosekrans | |
| 5,467,434 A | 11/1995 | Hower | |
| 5,550,957 A | 8/1996 | Davidson | |
| 5,555,416 A | 9/1996 | Owens | |
| 5,638,504 A * | 6/1997 | Scott et al. | 715/202 |
| 5,692,111 A | 11/1997 | Marbry | |
| 5,832,191 A | 11/1998 | Thorne | |

(Continued)

FOREIGN PATENT DOCUMENTS

| GB | 2 351 374 | 12/2000 |
|---|---|---|
| GB | 2351374 | 12/2000 |

(Continued)

OTHER PUBLICATIONS

Novell, Inc. (Netware 5.1, Jan. 2000) Novell Distributed Print Services Administration Guide, pp. 13, 16, 78-85, 151 and 154.

(Continued)

*Primary Examiner* — Peling Shaw
(74) *Attorney, Agent, or Firm* — Fitzpatrick, Cella, Harper & Scinto

(57) ABSTRACT

Remotely installing a new printer on a client workstation that communicates via a network with a control point terminal by, in the control point terminal, performing an operation to add the new printer on the client workstation, and in response to the operation being performed, the control point terminal transmitting identification information of the new printer being added to an agent in the client workstation, and in the client workstation, the agent receiving the identification information from the control point terminal, in response to receiving the identification information of the new printer, the agent automatically obtaining printer configuration information and print driver information based at least in part on the received identification information, the agent automatically configuring the printer and installing a print driver based on the obtained printer configuration information and print driver information, and the agent creating a locally managed instance of the printer.

12 Claims, 15 Drawing Sheets

U.S. PATENT DOCUMENTS

| | | | |
|---|---|---|---|
| 5,845,090 A | 12/1998 | Collins | |
| 5,848,231 A | 12/1998 | Teitelbaum | |
| 5,860,012 A | 1/1999 | Luu | |
| 5,867,633 A | 2/1999 | Taylor | |
| 5,870,610 A * | 2/1999 | Beyda | 717/173 |
| 5,923,885 A | 7/1999 | Johnson | |
| 6,070,012 A | 5/2000 | Eitner | |
| 6,098,097 A | 8/2000 | Dean | |
| 6,138,153 A | 10/2000 | Collins | |
| 6,151,643 A * | 11/2000 | Cheng et al. | 710/36 |
| 6,184,998 B1 * | 2/2001 | Tebeka | 358/1.15 |
| 6,256,635 B1 * | 7/2001 | Arrouye et al. | 1/1 |
| 6,301,012 B1 * | 10/2001 | White et al. | 358/1.15 |
| 6,324,690 B1 | 11/2001 | Luu | |
| 6,594,700 B1 * | 7/2003 | Graham et al. | 709/230 |
| 6,871,221 B1 * | 3/2005 | Styles | 709/221 |
| 7,253,915 B2 | 8/2007 | Kemp | |
| 2003/0014623 A1 * | 1/2003 | Freed et al. | 713/150 |
| 2003/0200291 A1 | 10/2003 | Kemp | |

FOREIGN PATENT DOCUMENTS

| | | |
|---|---|---|
| JP | 06-309261 | 11/1994 |
| JP | 2000-330742 | 11/2000 |
| JP | 2001-325170 | 11/2001 |
| KR | 2001-0096738 | 11/2001 |

OTHER PUBLICATIONS

"Read Me First", Lexis-Nexis P-2219-1.

"WSH Walkthrough", Microsoft Corp. Website, URL:http://msdn.microsoft.com/library/en-us/script56/html/ . . . site visited Apr. 2, 2002.

WSH Network Administrator Sample Script, Microsoft Corp. Website, URL:http://msdn.microsoft.com/library/en-us/script56/html/ . . . site visited Apr. 2, 2002.

"Novell Distributed Print Services Administration Guide", Novell Corp., pp. 15 to 194. Downloaded from Novell website Apr. 2, 2002.

European Office Action dated Apr. 28, 2011 issued during prosecution of related European application No. 03251819.3-1245.

* cited by examiner

FIG. 10

Install Printer | Enterprise Driver Extentions | Macros | Arrange Groups

| Available Enterprise Driver Extentions | Description |
|---|---|
| ☐ Install Printer Plug-in | Provides a function to discover and install printers from the network directly from inside the driver UI |
| ☐ Update Driver Plug-in | Provides a function to update the Enterprise Driver version in the local machine |
| ☐ Print Redirect Plug-in | It provides a function to redirect print jobs and dynamic Print Redirect property page using DM_FSC ir |
| ☐ Device Management Plug-in | It provides a dynamic page for device Management in properties Dialog and printing preferences dialog |

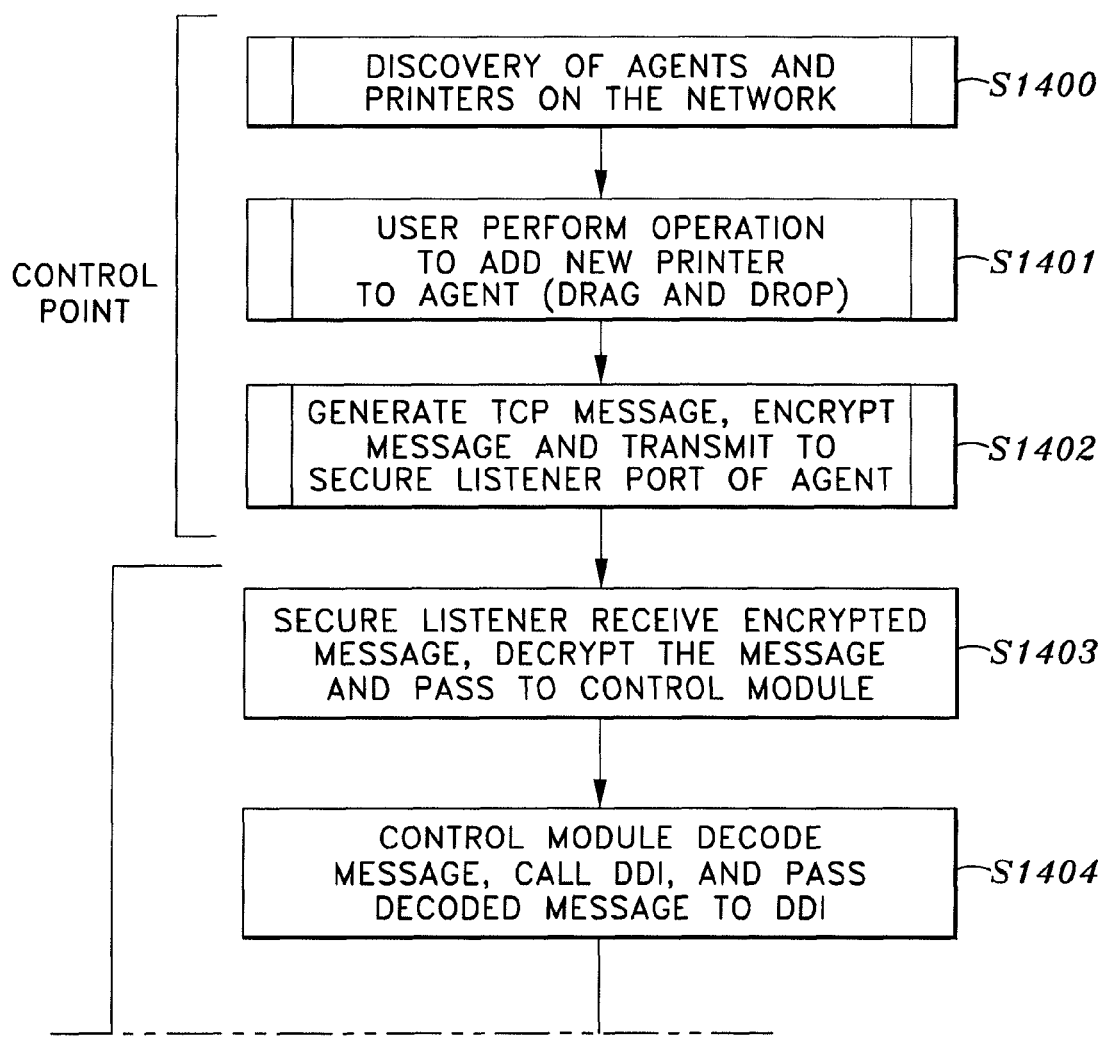

REMOTE CREATION OF PRINTER INSTANCES ON A WORKSTATION

This application is a continuation of application Ser. No. 10/131,289, filed Apr. 23, 2002 (allowed).

BACKGROUND OF THE INVENTION

1. Field of the Invention

The present invention concerns creation of printer instances in a printers folder on a workstation. More particularly, the present invention concerns remotely creating a printer instance in the printers folder of a workstation by performing an operation in a control point terminal to add a new printer to the printers folder, whereby identification information of the printer is transmitted to an agent in a client workstation such that the agent, utilizing the identification information, automatically obtains and installs printer configuration and print driver information of the printer and creates the instance of the printer in the printers folder.

2. Description of the Related Art

Conventionally, printer instances are created in a windows operating system by a user performing operations at the workstation. For instance, U.S. Pat. No. 5,692,111 to Marbry et al. (hereinafter referred to as the "'111 patent") describes a process in which a user adds a new server based printer in the windows registry of their workstation by browsing the network and selecting the server based printer that he/she wants to add. Upon selecting the server based printer, printer configuration files and print driver files for the selected printer are retrieved from a network bindery and are installed on the user's workstation, after which an instance of the server based printer is created in the user's windows registry. This process works well for installing printers at the workstation itself, but has problems relating to network management. More specifically, the foregoing process requires that either a user at each workstation add the printer, or that a network administrator physically go to each workstation and add the printer. It can readily be seen that the former requires each individual user to have some knowledge about the printer they want to add, while the latter is very time consuming for the administrator, particularly where a printer needs to be added to numerous computers. As a result of the former, some less sophisticated users may not select the most appropriate printer to add. Moreover, the foregoing process requires the user/administrator to be physically present at each workstation, thereby needlessly wasting the administrator's time. An additional problem with the '111 patent's approach is that, because the printer is part of a server based printing system, the printer is required to be set-up and configured on a print server before a user can install the printer on their workstation and submit a print job to the printer. Therefore, although the printer may be physically connected to the network, the printer is not able to be utilized until an administrator sets-up the printer in the print server.

Some techniques have been proposed for remotely adding printers to the printers folder of a workstation. One such technique requires at least some user action, such as logging-on to a network, in order to add a printer to the printers folder of a workstation. Because at least some user action is required, this technique is not truly remote and as a result, updates to the network configuration are not timely reflected in the workstation until the user action is performed. Another technique has been proposed in which an administrator creates, for example, an executable file that the administrator downloads to, and executes on, the workstation. While this technique may be more remote than the foregoing technique, this technique can nonetheless be time consuming for the administrator and, among other things, requires that the administrator be learned in the programming language that the file is written in. Thus, while these techniques perform remote creation of printer instances on a workstation, they do so in a way that each have their own drawbacks and which is fundamentally different than the technique proposed by the present invention.

SUMMARY OF THE INVENTION

The present invention provides an easier way to remotely install a new printer in a printers folder on a client workstation that communicates via a network with a control point terminal. According to the invention, an operation is performed in the control point terminal to add the new printer in the printers folder of the client workstation, and in response to the operation being performed, the control point terminal transmits identification information of the new printer being added to an agent in the client workstation. The agent in the client workstation receives the identification information from the control point terminal, and in response, the agent automatically obtains printer configuration information and print driver information based at least in part on the received identification information. Having obtained the printer configuration and print driver information, the agent automatically configures the printer and installs a print driver based on the obtained information. Finally, the agent creates a locally managed instance of the printer in the printers folder of the workstation.

As a result, the invention simplifies the process for remotely creating an instance of a printer on a workstation since no user intervention at all is needed and because no programming is required by the administrator. That is, the user does not need to perform any operations in order for the printer to be added, including logging-on to the network in order to invoke the installation process. Additionally, the administrator does not have to write any code in order for the printer to be added, but instead, the administrator can merely select the printer to be added and the workstation that it is to be added to utilizing, for instance, a simple drag and drop technique. Transparent to the administrator, the control point obtains the identification information of the printer, such as the IP address of the printer, and a device type of the printer and transmits the information and a command to add a new printer to the agent in the client workstation. Transparent to the user, the agent invokes, for example, a dynamic device installer (DDI) and provides the printer's identification information to the DDI, whereby the DDI, utilizing the printer's identification information, automatically queries the appropriate database, which may be stored, for example, locally or remote from the workstation, to obtain the printer configuration and print driver information needed to install the new printer. Upon obtaining the printer configuration and print driver information, the DDI automatically installs the new printer, including creating any port that may be needed for communicating with the new printer.

Moreover, the printer does not need to be set-up in a print server before the printer can be installed on the user's workstation. Because the control point and the agent install the printer for peer-to-peer communication, installing the printer in a print server is not needed, thereby making it even easier to install and manage the printer on the network.

Thus, in one aspect of the invention, remotely installing a new printer in a printers folder on a client workstation that communicates via a network with a control point terminal, comprises, in the control point terminal, performing an operation to add the new printer in the printers folder of the client workstation, and in response to the operation being performed, the control point terminal transmitting identification information of the new printer being added to an agent in the client workstation, and in the client workstation, the agent receiving the identification information from the control point terminal, in response to receiving the identification information of the new printer, the agent automatically obtaining printer configuration information and print driver information based at least in part on the received identification information, the agent automatically configuring the printer and installing a print driver based on the obtained printer configuration information and print driver information, and the agent creating a locally managed instance of the printer.

Other aspects provide for the printer configuration information and the print driver information to be automatically obtained from a remote device on the network, such as an FTP server, and automatically creating a port for communication with the printer. Thus, a database of printer configuration information and print drivers can be maintained on a remote server such that they can be readily accessed anytime an instance of a locally managed printer is to be created.

Additionally, the identification information of the printer may be a network address of the printer, such as an IP address, a printer's name, a DNS name or a NetBios name. With this aspect, the control point terminal merely provides an IP address or name of the printer to the agent and the IP address or name is utilized by the agent to obtain the printer configuration and print driver information from a database, such as that described above.

Further, the operation performed in the control point terminal may be as simple as an administrator dragging and dropping an icon of the new printer onto an icon of the agent utilizing a management console. Upon completion of the drag and drop operation, the control point generates and transmits a message to the agent for adding the new printer. As can readily be seen, adding a new printer becomes a simple operation for the administrator.

Additionally, the printer need not be an actual printer installed on the network, but may be a virtual printer instead. With this aspect, administrators can easily remotely create an instance of a virtual printer on a workstation merely by performing an operation to add a virtual printer at the control point terminal, whereby an identifier of the virtual printer is provided to the agent. In this regard, the database of printer configuration information and print driver information may include the required information for various virtual printers as well as actual printers installed on the network. As a result, an administrator can easily create an instance of a virtual printer on a workstation by merely dragging and dropping an icon of the virtual printer onto an icon of the workstation.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 10 depicts an example of an installation pane for the control point of FIG. 7.

DETAILED DESCRIPTION OF THE PREFERRED EMBODIMENTS

Figure 1:
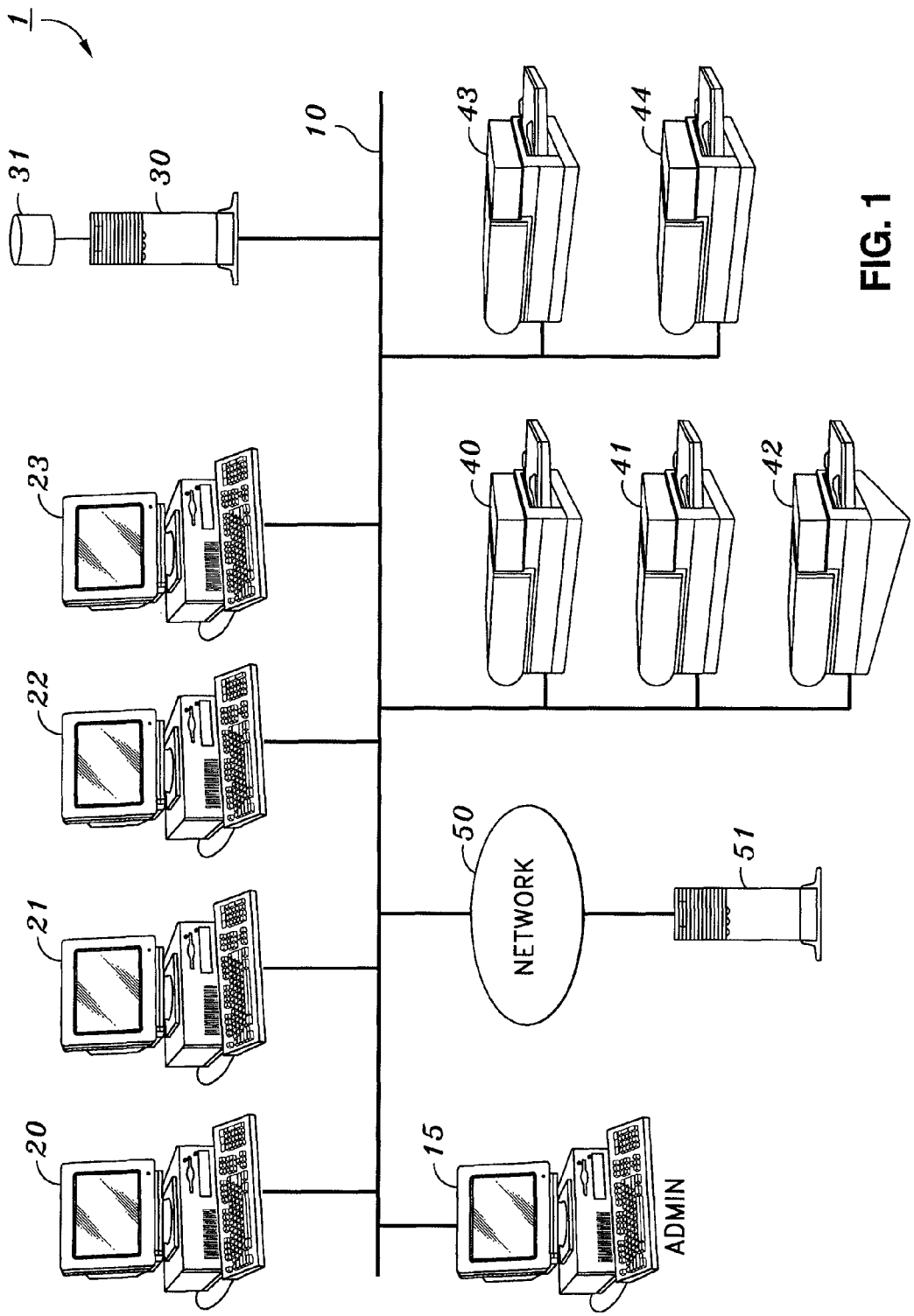
FIG. 1 depicts an example of a network environment in which the invention may be employed.

FIG. 1 depicts an example of a network environment in which the invention may be employed. The network 1 is preferably a local area network (LAN), but may be virtually any other type of network. Network 1 may include various computing components such as workstations, printers, servers, etc. that communicate with one another over network infrastructure, generally depicted as backbone 10. Backbone 10 may include various communication devices such as routers and data communication hubs (not shown) that provide a communication link between the various components connected to the network, as well as communication with other networks such as Internet 50 which may include web server 51. Network 1 preferably includes at least one network administrator terminal, such as terminal 15, a plurality of client workstations, such as workstations 20 to 23, and a plurality of printers, such as printers 40 to 44. Network administrator terminal 15 provides a way for an administrator to manage the network, including performing operations to add new printers to any one or more of the client workstations connected to the network. Each of the client workstations, as well as the network administrator terminal, are preferably capable of submitting print jobs to at least one of printers 40 to 44. The print jobs are preferably submitted to the printers on a peer-to-peer basis, although conventional server based printing may, of course, be implemented on the workstations as well. In this regard, network 1 may also include at least one local server, such as server 30, which may include a fixed storage disk such as disk 31 that may be either internal or external to server 30. Each of the components shown in FIG. 1 are merely representative of some devices that may be included in a network environment and, of course, numerous other components may also be connected to the network. However, for brevity, the description of the invention will be limited to use with those components shown in FIG. 1.

Client workstation 20 is preferably an IBM or compatible personal computer employing a windows operating system, such as Microsoft® Windows® 2000 or Window NT® 4.0. Workstations 21 to 23, as well as administrator terminal 15, may be similar to workstation 20 and therefore, the following description applies equally for these workstations. Workstation 20 preferably includes a mass storage device such as a hard disk for storing data files and application program files. As stated above, workstation 20 preferably employs a windows operating system which would be stored on the hard disk. From workstation 20, a user can perform various operations utilizing application programs stored on the disk, including submitting print jobs to any of printers 40 to 44 connected to network 1. That is, a user, wanting to print a hardcopy printout on one of printers 40 to 44 performs a process within an application program to submit the print job to a selected printer. In this regard, before the user is able to submit the print job to one of printers 40 to 44, necessary print driver and configuration files are required to be installed on workstation 20 in order for workstation 20 to communicate with the selected printer. This process will be described in more detail below, but once the necessary files are installed and the workstation is able to communicate with the printer, the user is able to select the printer and submit a print job thereto. Workstation 20 is also able to communicate with the other devices on the network, such as local server 30 and FTP/HTTP (web) server 51, and this process will also be described in more detail below.

Printers 40 to 44 are connected to network 1 for users, such as a user at workstation 20, to be able to submit a print job to them for printing. Printers 40 to 44 are preferably network enabled printers that include a network interface for communicating with backbone 10 and workstation 20. In this regard, printers 40 to 44 may be any type of network enabled printer and need not be any particular type of printer. Since printers 40 to 44 are network enabled printers, they are generally connected to and setup for communication over the network by a network administrator. Setting up the printers may simply comprise manually setting the printer configuration on the printer itself and assigning an IP address to the printer. Once the printers are connected to the network, an instance of the printer can then be created on a workstation to add the printer to the windows registry of the workstation. There are various conventional techniques for a user to perform a process at the workstation itself to add the printer to the windows registry and any of those techniques could still be employed in conjunction with the invention. However, the present invention is directed more particularly to a network administrator adding the new printer to the windows registry of one or more of the workstations from a remote location, such as administrator terminal 15. This process will be described in more detail below, but for the present discussion, once the printer has been installed on the workstation, the user is able to submit a print job to the printer for printing.

Figure 2:
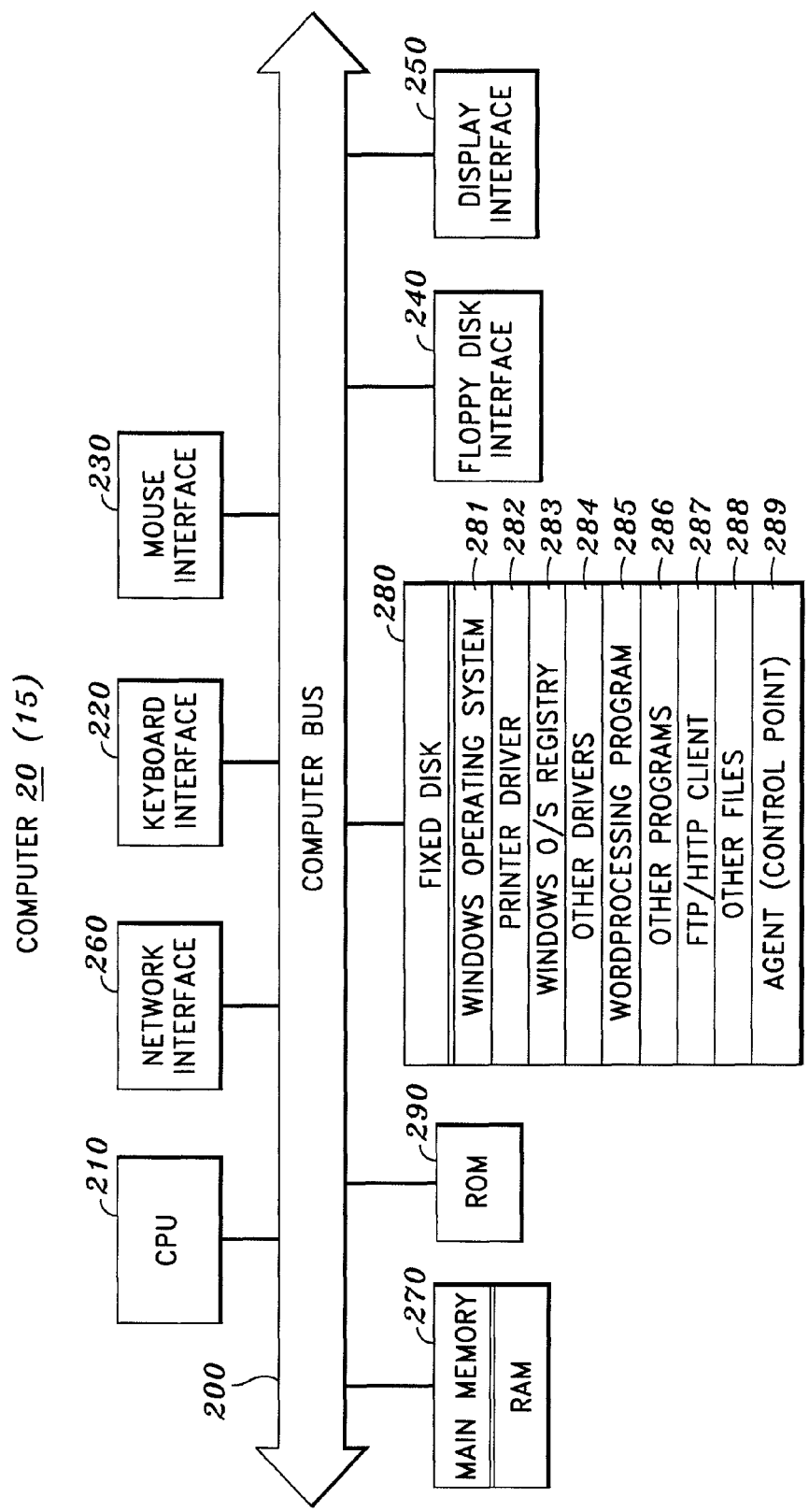
FIG. 2 depicts an example internal architecture of a computer workstation.

FIG. 2 is a block diagram showing an example of the internal architecture of a computer workstation, such as any of workstations 20 to 23 or administrator terminal 15. For brevity, however, the description of FIG. 2 will be made with reference to workstation 20. In FIG. 2, workstation 20 is seen to include central processing unit (CPU) 210 such as a programmable microprocessor which is interfaced to computer bus 200. Also coupled to computer bus 200 are keyboard interface 220 for interfacing to a keyboard, mouse interface 230 for interfacing to a mouse or other pointing device, floppy disk interface 240 for interfacing to a floppy disk, display interface 250 for interfacing to a monitor or other display, and network interface 260 for interfacing to backbone 10.

Random access memory (RAM) 270 interfaces to computer bus 200 to provide CPU 210 with access to memory storage, thereby acting as the main run-time memory for CPU 210. In particular, when executing stored program instruction sequences, CPU 210 loads those instruction sequences from fixed disk 280 (or other memory media) into RAM 270 and executes those stored program instruction sequences out of RAM 270. It should also be noted that standard-disk swapping techniques available under windowing operating systems allow segments of memory to be swapped to and from RAM 270 and fixed disk 280. Read-only memory (ROM) 290 stores invariant instruction sequences, such as start-up instruction sequences for CPU 210 or basic input/output operation system (BIOS) sequences for the operation of peripheral devices attached to workstation 20.

Fixed disk 280 is one example of a computer-readable medium that stores program instruction sequences executable by CPU 210. The program instructions may constitute windows operating system 281, printer driver 282, windows operating system registry 283, other drivers 284, word processing program 285, other programs 286, FTP/HTTP client 287, other files 288, and agent 289. As mentioned above, operating system 281 is preferably a windows operating system such as Microsoft® Windows® 2000, although other types of operating systems may be used with the present invention. Printer driver 282 is utilized to prepare image data for printing on at least one image forming device, such as printers 40 to 44. Windows Registry 283 stores information for registering various devices in the windows operating system when the devices are installed on workstation 20. Other drivers 284 include drivers for each of the remaining interfaces which are coupled to computer bus 200.

Word processing program 285 is a typical word processor program for creating documents and images, such as Microsoft Word, or Corel WordPerfect documents. Other programs 286 contains other programs necessary to operate workstation 20 and to run desired applications. FTP/HTTP client 287 provides functionality for workstation 20 to request and receive data and information via FTP (File Transfer Protocol) and HTTP (Hypertext Transfer Protocol) protocols from other devices connected to the network. Other files 288 include any of the files necessary for the operation of workstation 20 or files created and/or maintained by other application programs on workstation 20. For example, Internet browser application programs, such as Microsoft Internet Explorer or Netscape Navigator, may be included in other files 288.

Also included on fixed disk 280 in workstation 20 is agent 289. Agent 289 is a client side portion of a remote management application according to the invention. In this regard, as stated above, the architecture depicted in FIG. 2 is applicable to both client workstations 20 to 23 as well as administrator workstation 15. One difference between client workstations 20 to 23 and administrator workstation 15 is that, in workstation 15, agent 289 is replaced with an administrator side portion (hereinafter referred to as a "control point") of the remote management application. A more detailed description of the functionality of agent 289 and the control point in workstation 15 will be provided below, but briefly, agent 289 receives commands from the control point, such as a command to add a new printer to the windows registry, and processes the commands to execute an action contained in the command. The protocol for the commands transmitted by the control point to the agent may be, for example, TCP/IP, but any other protocol may be used instead.

Figure 3:
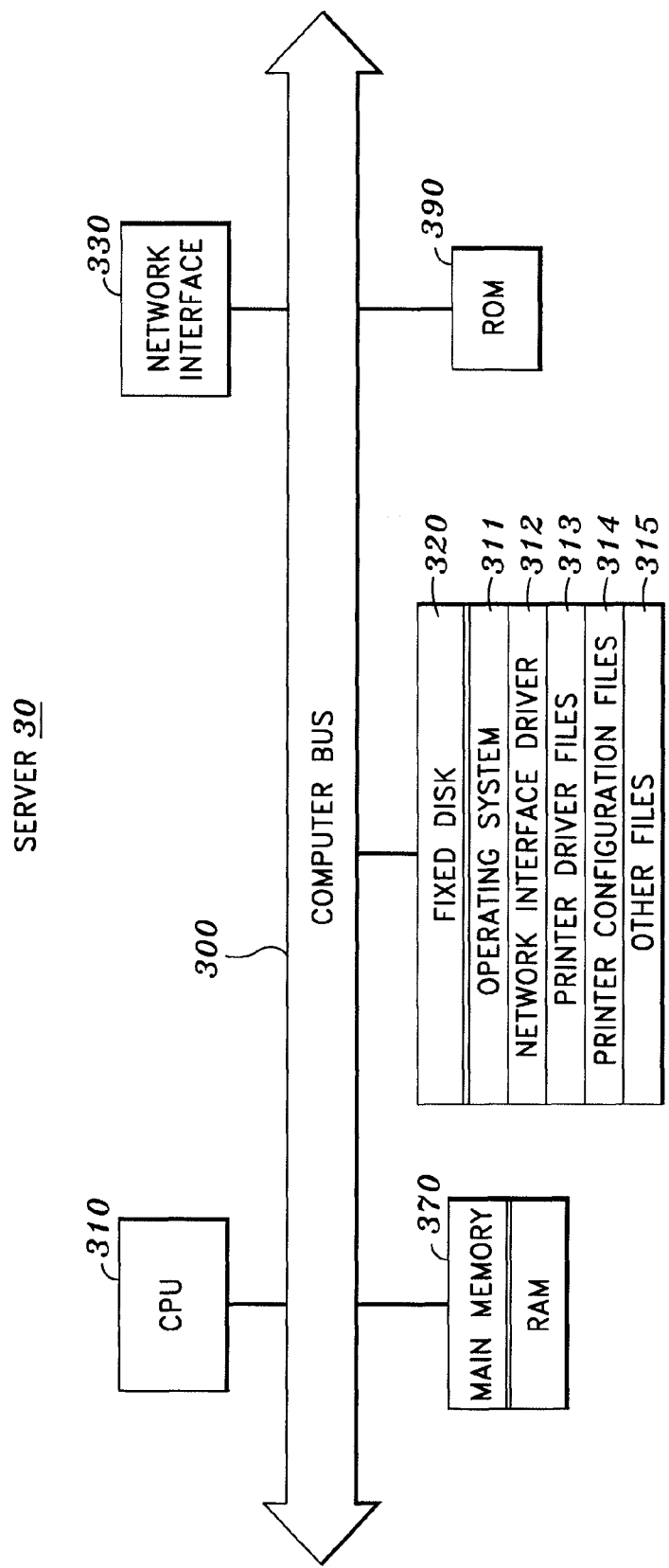
FIG. 3 depicts an example internal architecture of a local area network server.
Figure 4:
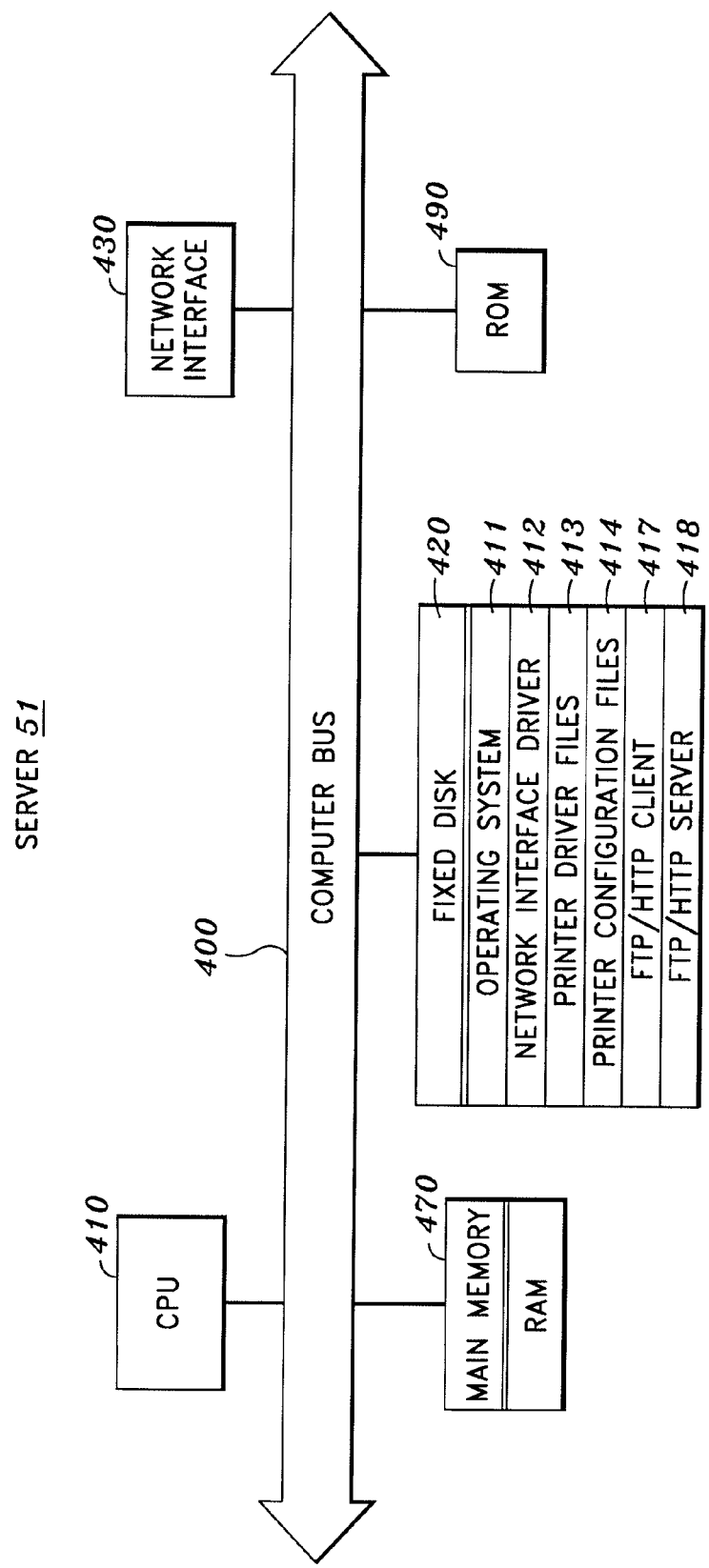
FIG. 4 depicts an example internal architecture of a web server.

FIGS. 3 and 4 depict block diagrams showing an overview of the internal architecture of servers 30 and 51, respectively. In this regard, the internal architecture of both servers may be similar. However, for additional clarity, server 30 is depicted as a server which serves the local area network, whereas server 51 is depicted as a web server. Accordingly, the following description of the internal architecture applies equally for both of servers 30 and 51 with like components having corresponding reference numerals, except where specifically pointed out. In FIG. 3, server 30 is seen to include a central processing unit (CPU) 310 such as a programmable microprocessor which is interfaced to computer bus 300. Also coupled to computer bus 300 is a network interface 360 for interfacing to backbone 10. In addition, random access memory (RAM) 370, fixed disk 320, and read-only (ROM) 390 are also coupled to computer bus 300. RAM 370 interfaces to computer bus 300 to provide CPU 310 with access to memory storage, thereby acting as the main run-time memory for CPU 310. In particular, when executing stored program instruction sequences, CPU 310 loads those instruction sequences from fixed disk 320 (or other memory media) into RAM 370 and executes those stored program instruction sequences out of RAM 370. It should also be recognized that standard disk-swapping techniques allow segments of memory to be swapped to and from RAM 370 and fixed disk 320. ROM 390 stores invariant instruction sequences, such as start-up instruction sequences for CPU 310 or basic input/output operating system (BIOS) sequences for the operation of peripheral devices which may be attached to server 30 (not shown).

Fixed disk 320 is one example of a computer-readable medium that stores program instruction sequences executable by CPU 310. In both server 30 and server 51, the program instruction sequences may include operating system 311 (411), network interface driver 312 (412), printer driver files 313 (413), and printer configuration files 314 (414). Operating system 311 can be an operating system such as Windows NT 4.0 (or later versions thereof), UNIX, Novell Netware or other such server operating systems. Network interface driver 312 is utilized to drive network interface 360 for interfacing server 30 to backbone 10. Printer driver files 313 and printer configuration files 314 are preferably part of a comprehensive database of printer information that is stored in either or both of server 30 or server 51. In this regard, the database preferably includes information for as many printers (including virtual printers) as can be maintained in fixed disk 320 so that printer configuration information and print driver information for practically any printer, including virtual printers, can be obtained and installed on workstation 20. Other files 315 contains other files or programs necessary to operate server 30 and/or to provide additional functionality to server 30.

Differences between server 30 and server 51 may be that server 51 preferably includes FTP/HTTP client 417 to provide server 51 with the ability to retrieve and transmit data files via FTP and HTTP protocols over the network through network interface 460, and FTP/HTTP server 418 which can be accessed by an FTP/HTTP client in a workstation such as workstation 20. Of course, an FTP/HTTP client and server could also be incorporated in server 30, but such have been omitted from FIG. 3 merely for clarity.

A more detailed description will now be made of how the agent receives and processes commands issued by the control point.

Figure 5:
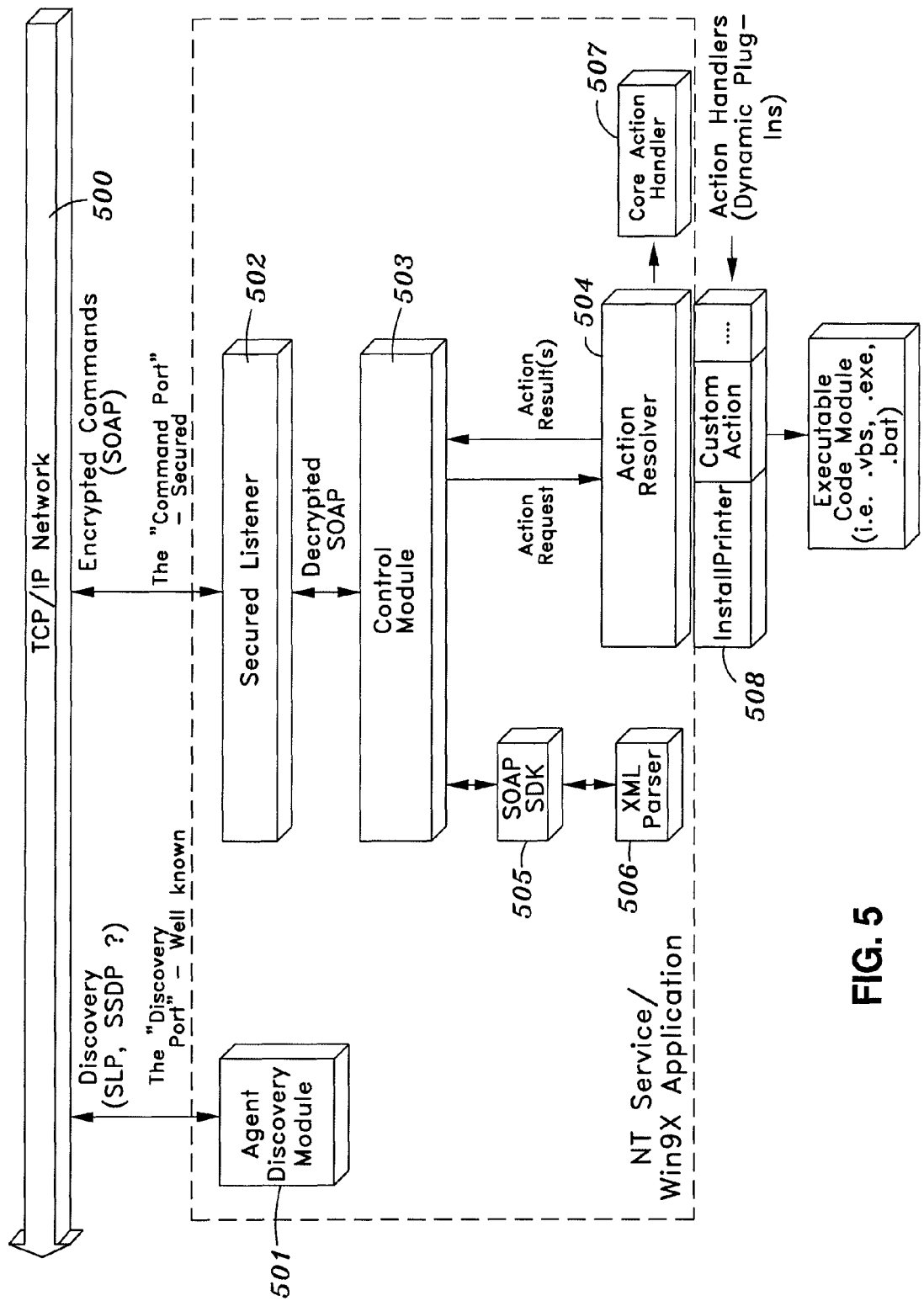
FIG. 5 is a block diagram depicting an architecture of a remote management agent according to the invention.

FIG. 5 is a block diagram depicting the architecture for agent 289. The architecture depicted in FIG. 5 has been designed with particular applicability to Windows NT and windows versions 9x, but it can readily be understood that the functionality is not so limited and can be applied to any operating system. As seen in FIG. 5, the agent communicates with the network via TCP/IP network 500, which may comprise workstation 20 receiving commands or requests via network interface 260. The agent receives commands and discovery requests via TCP/IP network 500, and responds to the commands and requests via the same. An example of a request that may be received by the agent is a discovery request issued by the control point in administrator 15 to determine which agents are connected to the network.

In this regard, the agent preferably includes discovery module 501 to receive and process such a request. Thus, discovery module 501 provides a way for the agent to be discovered by the control point in the administrator terminal 15. Discovery is performed by discovery module 501 listening passively, via a well-known IP port, for an incoming "search" request from the control point. The "search" request may be performed by the control point utilizing, for example, a Simple Service Discovery Protocol (SSDP), a Simple Lookup Protocol (SLP), or some other type of discovery protocol. Upon receipt of a "search" request by discovery module 501, module 501 responds with the IP port for a secured listener module 502 of the agent. The control point of administrator 15 then utilizes the IP port of the secured listening module 502 to provide commands for execution by the agent.

Secured listening module 502 is preferably a dynamically created re-usable encryption supporting TCP data socket. As such, security can be enhanced since the only way to determine the IP port of the secured listening module is via the discovery module. Module 502 listens to the command port for commands targeted for the agent. The module 502 receives encrypted TCP commands that are transmitted by the control point, decrypts the command and verifies the integrity of the TCP message. Upon successful decryption and security checks, the decrypted TCP data is passed to control module 503.

Control module 503 is the primary coordinator of the agent. Responsibilities of control module 503 include creating, destroying and controlling the secured listener, as well as receiving the TCP message data from the secured listener and converting it into a message format to be utilized by other components of the agent. The converted format is preferably a Simple Object Access Protocol (SOAP) that includes an "action" and arguments for the action, but other formats may be utilized instead. The control module performs authentication and some security checks on the SOAP message, and if the message passes, the message is decoded to extract the action and list of arguments from the SOAP message. In decoding the SOAP message, a SOAP SDK 505 and an XML parser 506 provide functionality to the control module. The SOAP SDK 505 is responsible for 1) providing SOAP decoding functionality to the control module for decoding an incoming SOAP message into the contained action and "in" arguments, and 2) providing SOAP encoding functionality to the control module for encoding the action results and "out" parameters into a SOAP message for sending to the control point. The XML parser 506 is responsible for supporting the SOAP SDK by parsing XML data, obtained from the secured listener and passed to the control module, into element tags. The element tags are used to encode the SOAP message and need to be obtained in order to decode the SOAP message. Once the SOAP message has been decoded, the control module decides the proper routine to call to handle the action. In this regard, the control module may determine that it has the code itself to handle the call, or it may hand the code off to an Action Resolver 504.

Action resolver 504, when called by the control module, is responsible for finding the code needed to implement the requested action. If the action is considered a "core action" (i.e., an action that the agent application itself includes as core functionality, such as CopyFile, DOSExecute, DeleteFile, Registry manipulation, etc.), the action resolver calls the appropriate function internally from core action handler 507. If, on the other hand, the action is not a core action, the action resolver will check any installed extension actions (i.e., plug-ins) that add extensible functionality to the agent, such as InstallPrinter plug-in 508. The extension actions may be, for example, external modules (dlls) that can be added to and deleted from the agent by the control point. Once the correct code has been located, the action is executed by the code, whereby the action resolver generates a list of return arguments and passes it to the control module. The control module, in turn, uses the SOAP SDK 505 to generate a SOAP message that is passed to the secured listener 502. The secured listener 502 encrypts the message and sends it back to the control point.

Figure 6:
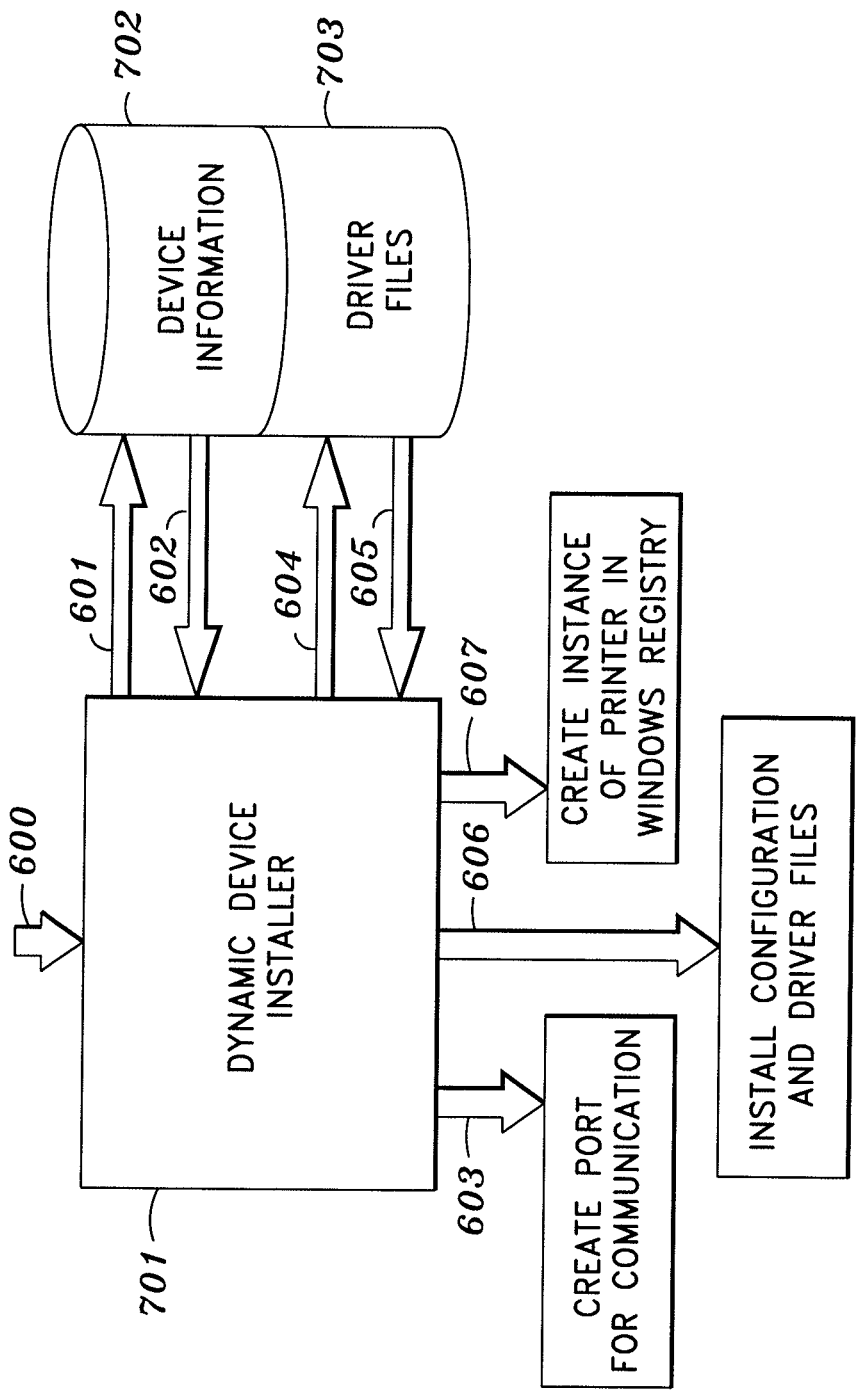
FIG. 6 depicts an example of communication performed by a dynamic device installer for installing a new printer on a workstation in accordance with the invention.

A more detailed description of the InstallPrinter extension action 508 will now be provided with regard to FIG. 6. The InstallPrinter extension 508, or more generally referred to as a dynamic device installer (DDI) 701, receives an incoming action call 600. The action call may be the result of an administrator performing an action at the control point in terminal 15 to add a new printer, such as printer 40, to the agent of workstation 20. The action call may include a command to add a new printer and an argument list. The argument list may include, for example, identification information of the printer to be added (e.g. IP address, the printer's name, a NetBios name, etc.), and the device type of the printer. Having received the printer's identification information and device type, the DDI performs a query (601) of a known database 702 for device configuration information corresponding to the device type. Querying the database 702 may comprise performing an FTP or HTTP query of server 51 for printer configuration files 414. The query may be performed, for example, by utilizing FTP client 417. Of course, if the database of configuration files is included on workstation 20, on a removable recording medium such as a floppy disk or a CD-ROM, or any other storage location, the DDI would query that location instead. Regardless of where the device configuration files are maintained, the printer configuration files are provided to the DDI in a response 602.

Having obtained the device configuration information, the DDI automatically installs the device configuration files (606) and automatically creates a port for communication with the printer (603). That is, the DDI configures the printer as a local printer (i.e., a printer that communicates with the workstation as peer-to-peer) by determining the appropriate port for communicating with the printer and configures the port within the windows operating system of workstation 20 without the need for user input. The DDI automatically creates the port by manually creating the necessary data structures in the registry transparent to the spooler. The DDI then starts-stops the spooler so that the spooler will re-read the data structures, after which the spooler knows of the new printer port and that it can be used to send data.

The DDI then performs a query (604) for print driver files for the type of printer being installed. The query is performed of a database 703 for print driver files, which is preferably maintained in the same location as the database 702. The appropriate print driver files are determined from the database and returned to the DDI via a response (605), whereby the DDI automatically installs the driver files for the printer (606). Once the printer has been configured, the port for communication has been created, and the driver files have been installed, the DDI registers the new printer in the windows registry and creates an instance of the printer (607). Thus, the new printer is added by the control point issuing a command to the agent to add the new printer, whereby the DDI is called and processes the command to add the new printer. The user can then submit a print job directly to the printer from the workstation.

Figure 7:
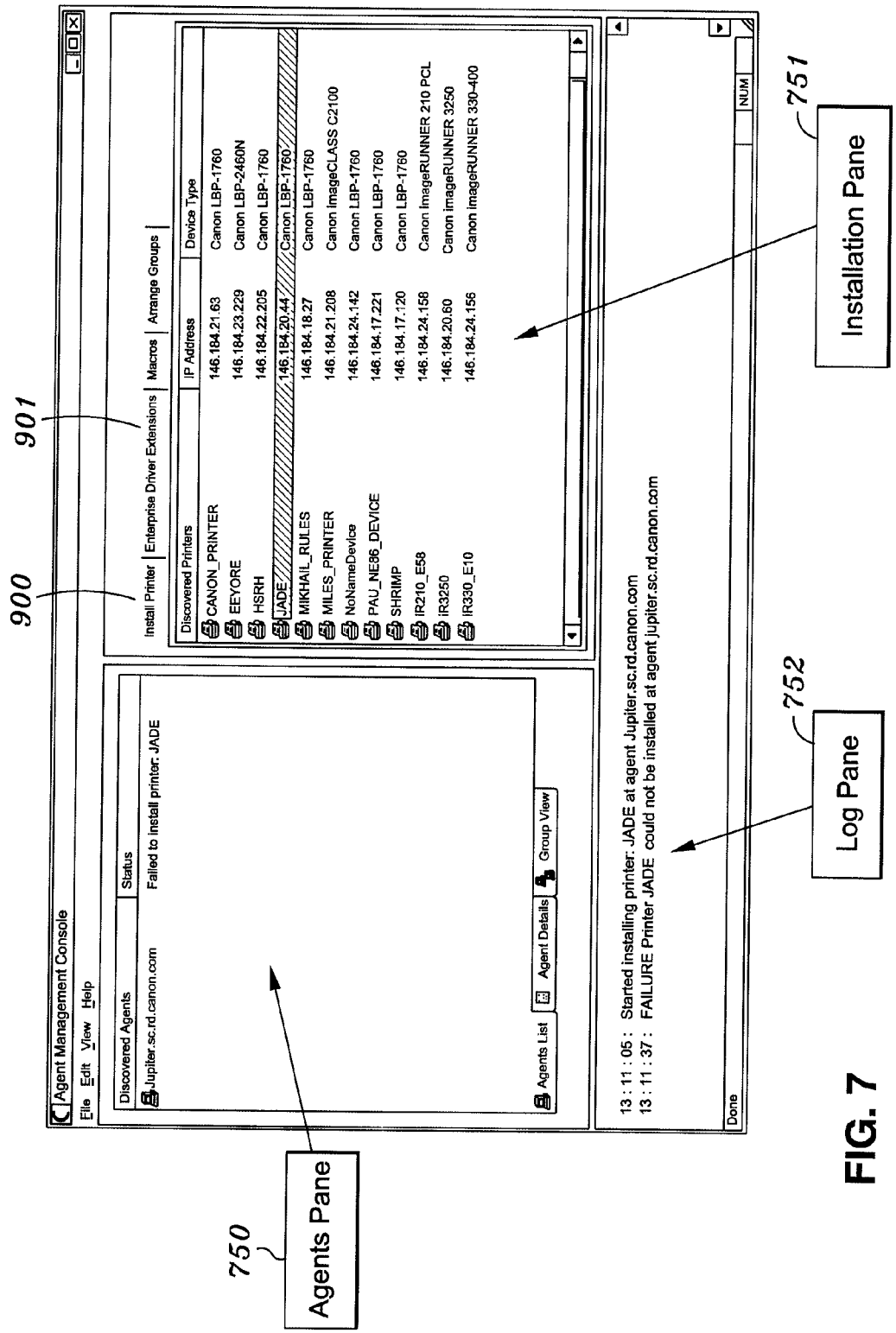
FIG. 7 depicts an example of a graphical user interface for a control point according to the invention.

FIGS. 7 to 10 depict examples of a graphical user interface for the control point of the invention from which a network administrator can perform various remote operations on client workstations, including adding a new printer. As seen in FIG. 7, the control point interface may include an agents pane 750, an installation pane 751 and a log pane 752.

Figure 8:
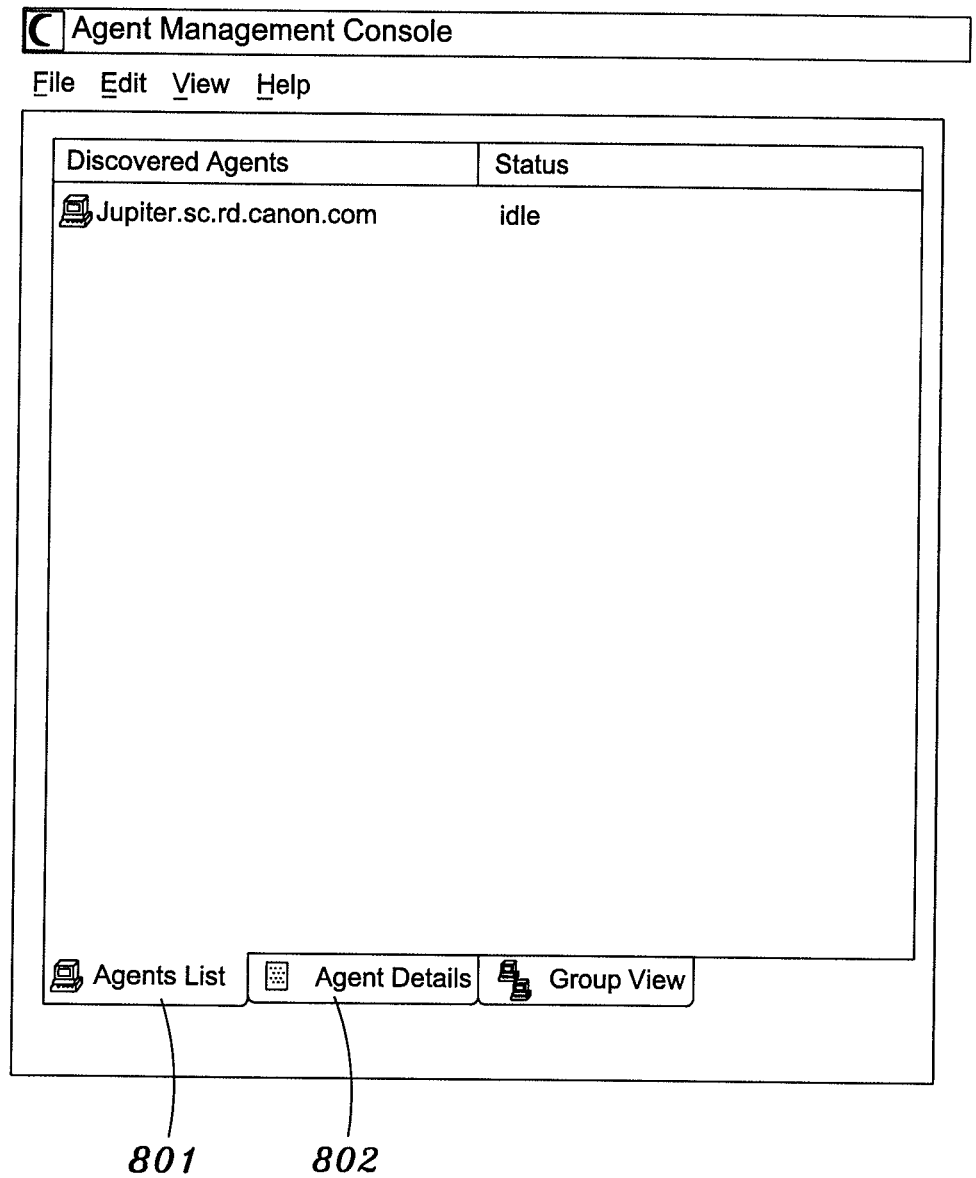
FIG. 8 depicts an example of an agents pane with an Agents List tab selected.
Figure 9:
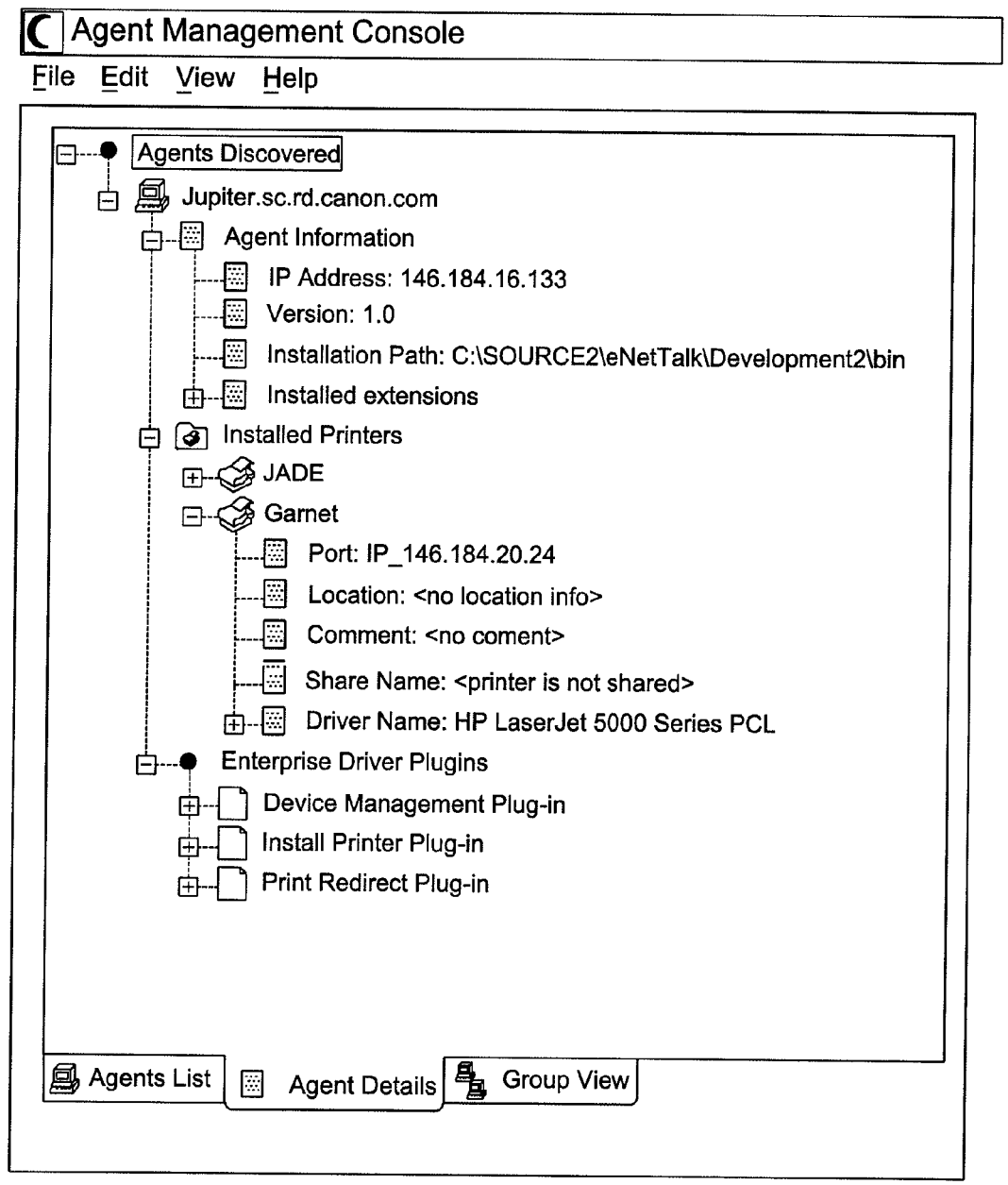
FIG. 9 depicts an example of an agents pane with an Agent Details tab selected.

Agents pane 750 provides a way for the administrator to view those agents that are on the network, to view detailed information of each agent, including installed printers and installed driver extensions, and to select an agent to add a new printer to or to add driver extension to. In FIG. 7, only one agent is depicted as having been discovered, but it should be noted that the agents pane typically will list multiple agents. The agents pane is depicted in more detail in FIGS. 8 and 9, with FIG. 8 depicting the agents pane with Agents List tab 801 selected and FIG. 9 depicting the agents pane with Agent Details tab 802 selected. As seen in FIG. 8, selecting the Agents List tab depicts a listing of all discovered agents on the network. As described above, the control point may issue a "search" request to determine those agents that are on the network, and those agents responding are depicted in the listing of FIG. 8. As seen in FIG. 9, when the Agent Details tab is selected, the administrator can view the details of any selected agent. Details may include, for example, the IP address of the agent, installed printers, and which extension plug-ins are currently installed in the agent.

Installation pane 751 includes, for example, Install Printer tab 900 and Enterprise Driver Extension tab 901. Utilizing either of tabs 900 or 901, the administrator can select a printer or a driver extension to add to an agent depicted in the agents pane. As seen in FIG. 7, when the Install Printer tab is selected, all printers that are installed on the network are listed in the installation pane. Thus, the administrator can select which printer is to be added to an agent depicted in the agents pane. As seen in FIG. 10, when Enterprise Driver Extension tab 901 is selected, a listing of available drivers is provided. From this listing, the administrator can select a driver extension to add to an agent listed in the agents pane.

Log pane 752 lists any action that the administrator takes so that the administrator can check the results of the action. This pane can be particularly useful if the administrator is installing multiple items in multiple agents.

Figure 11:
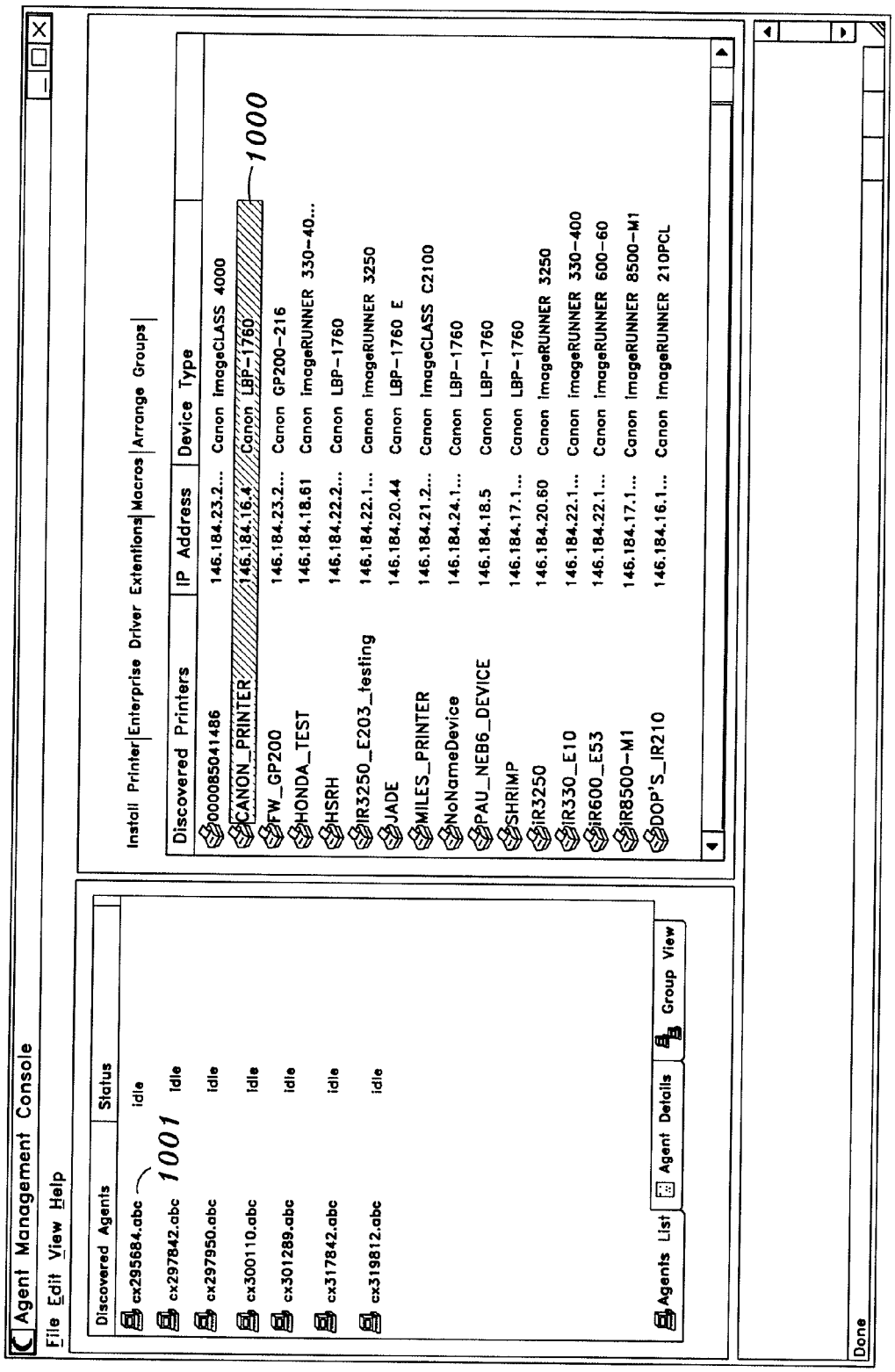
FIGS. 11 to 13 show an example of performing a drag and drop operation in the control point to add a new printer to an agent.
Figure 12:
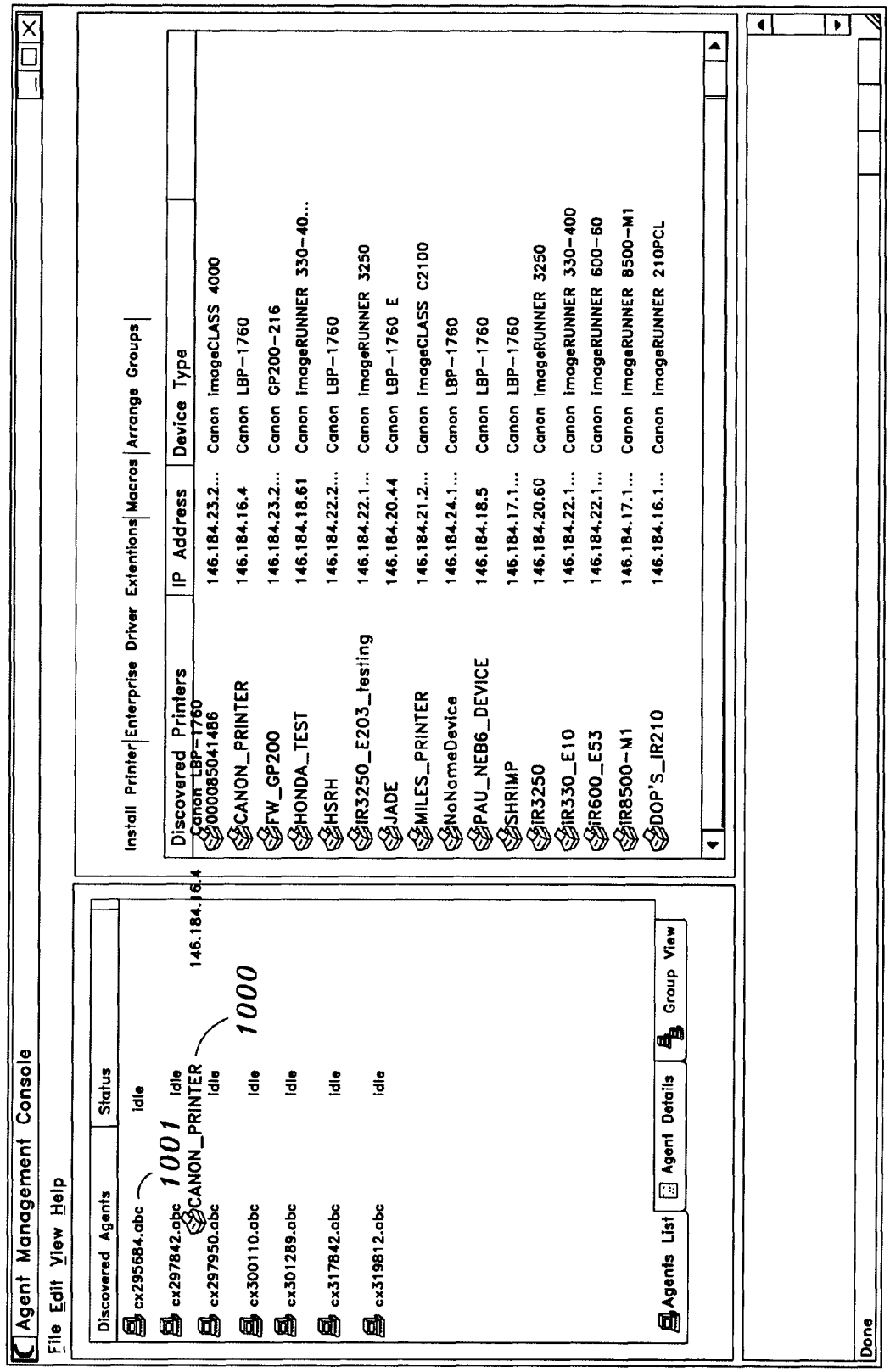
Figure 13:
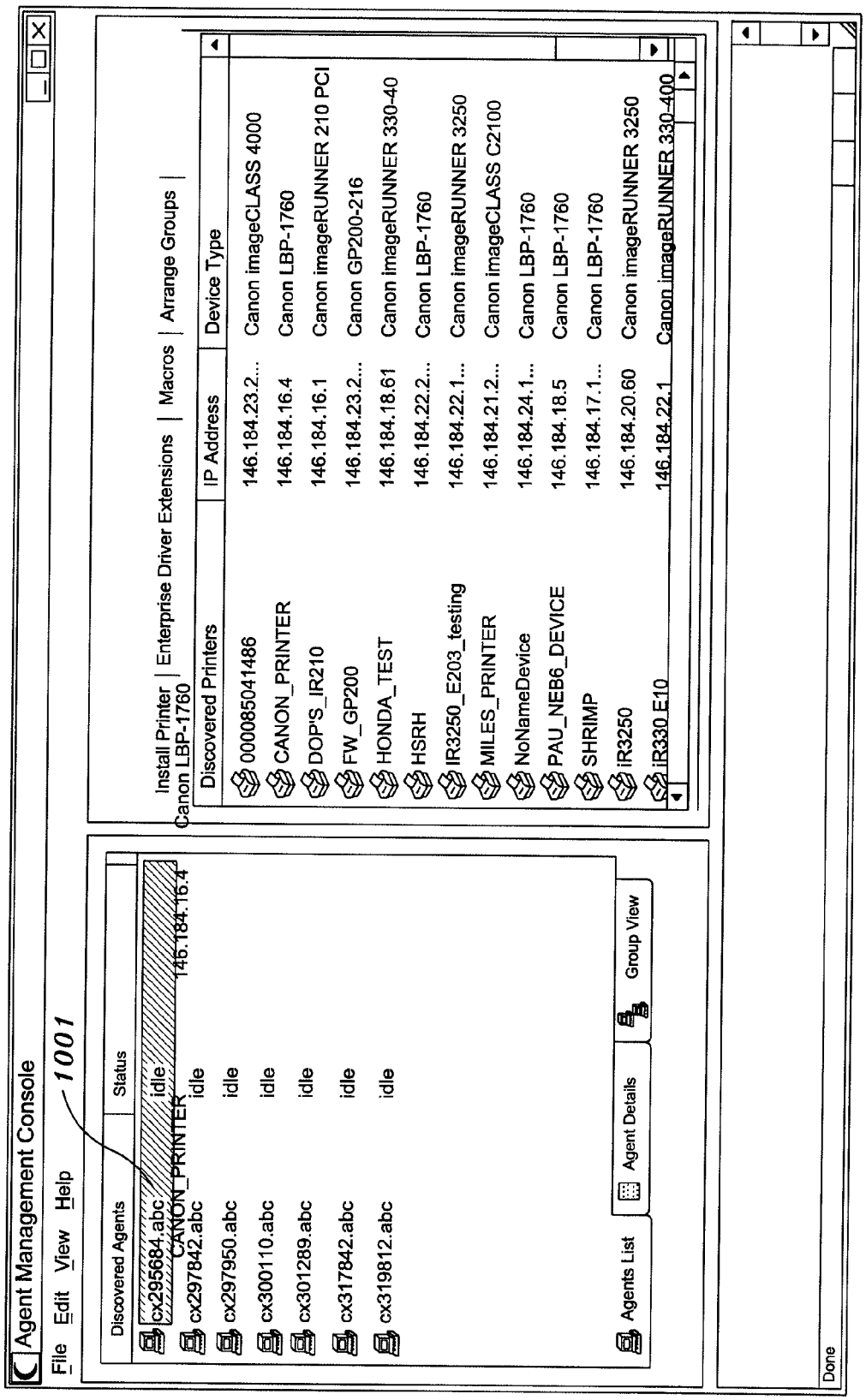

An example of an administrator adding a new printer to an agent will now be described with regard to FIGS. 11 to 13. As seen in FIG. 11, the Agents List tab has been selected and all discovered agents are listed in the agents pane. Additionally, the Install Printer tab is selected in the installation pane and all printers on the network are listed in the pane. To add printer 1000 (CANON_PRINTER) to agent 1001 (cx295684-abc), the administrator clicks on printer 1000 in the installation pane with a pointing device such as a mouse and performs a simple drag and drop operation to drag the selected printer 1000 onto the icon of agent 1001 in the agents pane. FIG. 12 depicts a ghost image of the printer 1000 as the icon of printer 1000 is being dragged from the installation pane onto the icon of agent 1001 in the agents pane. In FIG. 13, once the icon of printer 1000 is located on top of the icon for agent 1001, the icon of agent 1001 is highlighted, after which the administrator completes the drag and drop process. In response to the drag and drop operation to add printer 1000 to agent 1001, the control point issues a command to the secure listening module port of agent 1001 to add printer 1000. Following the procedure described above with reference to FIGS. 5 and 6, the agent processes the command and the new printer is installed in the windows registry on the workstation containing agent 1001. In a similar manner, the administrator can perform a simple drag and drop operation to add a driver extension to a selected agent. Likewise, the administrator can add a printer to a group of workstations by performing a drag and drop operation onto a group which contains multiple agents.

Figure 14B:
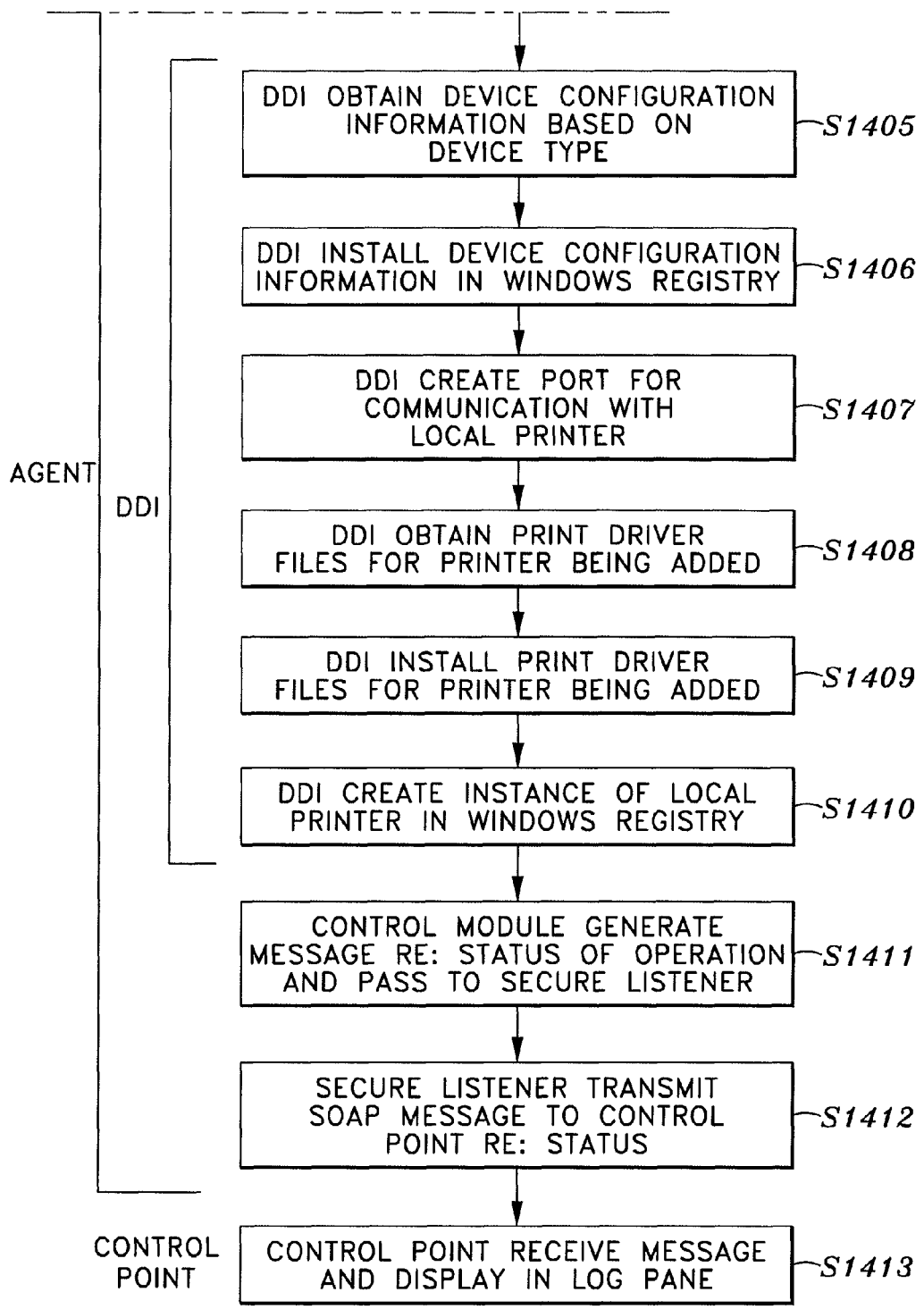
FIG. 14 is a flowchart of process steps for remotely adding a new printer to a workstation.

FIG. 14 is a flowchart of process steps for remotely adding a new printer to a workstation according to the invention. The process steps of FIG. 14 involve steps performed at both the control point and the agent, with additional emphasis placed on an install printer extension module for the agent (referred to more generally as a DDI (Dynamic Device Installer)). In step S1400, the control point discovers all agents and printers on the network. As described above with regard to FIG. 5, the discovery may be performed by the control point issuing a search request to a known IP port for each computer workstation on the network, or by all devices on the network merely listening for a message on the network. If the workstation has an installed agent, the discovery module of the agent responds to the search request by providing the control point with the IP port for the secure listening module of the agent. As a result, all agents that are discovered on the network are listed in the agents pane of the control point graphical user interface (hereinafter referred to as the "agent management console"). When a user, preferably a network administrator, wants to add a new printer to an agent on the network, the user performs an operation to add the new printer (step S1401). As described above with regard to FIGS. 11 to 13, this process may simply comprise selecting a printer from the installation pane of the agent management console and dragging and dropping the selected printer onto an icon of the agent in the agents pane. Upon completion of the drag and drop operation, the control point generates an encrypted TCP message and transmits the message to the secure listening IP port for the agent (step S1402).

In step S1403, the secure listening module receives the encrypted TCP message, decrypts the message, performs some security checks, and passes the message to the control module. This process was described in detail above with regard to FIG. 5. The control module decodes the message, calls the DDI and passes the message to the DDI (step S1404). This process was also described in detail above with regard to FIG. 5. The DDI, upon receiving the message, which includes an action to add a new printer, the device type and name or IP address of the new printer to be added, obtains device configuration information from a database, either locally or remotely via FTP/HTTP, based on the device type (step S1405). Having obtained the configuration files, the DDI installs them on the workstation (step S1406) and creates a port for communication with the printer (step S1407). The process of automatically creating a port was discussed above with regard to FIG. 6. The DDI also obtains print driver files for the printer from a database (step S1408), either locally or remotely via FTP/HTTP, and installs the print driver files on the workstation (step S1409). The DDI then creates an instance of the new printer in the windows registry of the workstation (step S1410).

The control module monitors the execution of the action by the DDI and upon completion, generates a message regarding the status of the operation (step S1411). That is, the control module generates a message indicating whether the operation to add the new printer was successful or not and passes the message to the secure listener module. The secure listener module then transmits a SOAP message to the control point (step S1412), whereby the message is displayed in the log pane of the agent management console (step S1413).

Although the foregoing provided a description of adding an actual printer to the windows registry (i.e., a printer that is physically connected to the network), the process steps of FIG. 14 can also be utilized to install virtual printers. A virtual printer is not an actual printer that prints out a hardcopy of a print job, but rather is a printer selected in an application program for which the print job is merely rendered into a particular format and the rendered job is printed to a file on the user's workstation. FIG. 14 could be utilized, whereby the administrator, instead of selecting an actual printer from the listing shown in the installation pane of FIG. 11, may select a virtual printer from the listing instead. The process would then be the same as that described above in which the DDI obtains device configuration information and driver files from a database and installs the virtual printer on the user's workstation.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method of remotely installing a selected printer on a client workstation that communicates via a network with a control point terminal, the method comprising the steps of:

in the control point terminal,
displaying, by an agent management program, a list of client workstations having an agent program, wherein the agent program is for controlling to install a printer driver on the client workstation;
executing, by the agent management program, a discovery operation which searches for printers in the network by communicating with the printers;
receiving, by the agent management program, discovery responses from printers in the network as a result of the discovery operation;
displaying, by the agent management program, a list of printers that respond to the discovery operation with the discovery responses;
performing, by the agent management program, an operation to add a printer selected from the displayed list of printers to a client workstation selected from the displayed list of client workstations having the agent program;
generating, in response to the operation to add the selected printer being performed, a message which includes identification information of the selected printer being added to the selected client workstation; and
transmitting the generated message for adding the selected printer to the agent program in the selected client workstation, and in the client workstation,
controlling a device installer module, in response to receiving the message for adding the selected printer, and obtaining a printer driver corresponding to the identification information included in the message from a remote device using FTP (File Transfer Protocol) or HTTP (HyperText Transport Protocol), wherein the agent program in the client workstation controls the device installer module under control of the control module of the agent program;
installing, with the device installer module, the obtained printer driver; and
creating, with the device installer module, a locally managed instance of the selected printer on the client workstation.

2. A method according to claim 1, wherein the identification information of the selected printer comprises a network address or device type of the printer.

3. A method according to claim 1, wherein the agent management program transmits the message for adding the selected printer to a secure listening port in the selected client workstation.

4. A method according to claim 1, wherein the agent management program encrypts the message for adding the selected printer and transmits the encrypted message.

5. A method according to claim 1, wherein the selected printer is a virtual printer.

6. A method according to claim 1, further comprising automatically creating a port for communication with the selected printer with the device installer module.

7. A system for remotely installing a selected printer on a client workstation that communicates via a network with a control point terminal, the system comprising:
- the control point terminal, comprising a processor and a memory storing executable code that, when executed by the processor, performs the steps of:
  - displaying, by an agent management program, a list of client workstations having an agent program, wherein the agent program is for controlling to install a printer driver on the client workstation;
  - executing, by the agent management program, a discovery operation which searches for printers in the network by communicating with the printers;
  - receiving, by the agent management program, discovery responses from printers in the network as a result of the discovery operation;
  - displaying, by the agent management program, a list of printers that respond to the discovery operation with the discovery responses;
  - performing, by the agent management program, an operation to add a printer selected from the displayed list of printers to a client workstation selected from the displayed list of client workstations having the agent program;
  - generating, in response to the operation to add the selected printer being performed, a message which includes identification information of the selected printer being added to the selected client workstation; and
  - transmitting the generated message for adding the selected printer to the agent program in the selected client workstation, and
- the client workstation, comprising a processor and a memory storing executable code that, when executed by the processor, performs the steps of:
  - controlling a device installer module, in response to receiving the message for adding the selected printer, and obtaining a printer driver corresponding to the identification information included in the message from a remote device using FTP (File Transfer Protocol) or HTTP (HyperText Transport Protocol), wherein the agent program in the client workstation controls the device installer module under control of the control module of the agent program;
  - installing, with the device installer module, the obtained printer driver; and
  - creating, with the device installer module, a locally managed instance of the selected printer on the client workstation.

8. A system according to claim 7, wherein the identification information of the selected printer comprises a network address or device type of the printer.

9. A system according to claim 7, wherein the agent management program transmits the message for adding the selected printer to a secure listening port in the selected client workstation.

10. A system according to claim 7, wherein the agent management program encrypts the message for adding the selected printer and transmits the encrypted message.

11. A system according to claim 7, wherein the selected printer is a virtual printer.

12. A system according to claim 7, further comprising automatically creating a port for communication with the selected printer with the device installer module.

* * * * *